(12) United States Patent
Wada et al.

(10) Patent No.: US 7,944,790 B2
(45) Date of Patent: May 17, 2011

(54) OPTICAL DISC APPARATUS AND DATA RECORDING METHOD THEREOF

(75) Inventors: Yasuhiro Wada, Kawaguchi (JP); Koichi Watanabe, Hachioji (JP); Toshio Shoji, Urayasu (JP); Takakiyo Yasukawa, Fujisawa (JP); Naohito Ikeda, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 567 days.

(21) Appl. No.: 12/073,080

(22) Filed: Feb. 29, 2008

(65) Prior Publication Data

US 2008/0298194 A1 Dec. 4, 2008

(30) Foreign Application Priority Data

May 29, 2007 (JP) ................................. 2007-142272

(51) Int. Cl.
*G11B 11/00* (2006.01)
(52) U.S. Cl. ................. 369/53.34; 369/47.5; 369/47.51; 369/53.36; 369/59.11
(58) Field of Classification Search .................. 369/47.5, 369/47.51, 53.34, 53.36, 59.11
See application file for complete search history.

(56) References Cited

U.S. PATENT DOCUMENTS

| 5,703,865 A * | 12/1997 | Guo ............................. 369/47.51 |
| 6,526,013 B1 * | 2/2003 | Narumi et al. ............. 369/47.53 |
| 6,958,962 B2 * | 10/2005 | Ogawa ........................ 369/47.53 |
| 7,613,089 B2 * | 11/2009 | Lee et al. .................... 369/47.53 |
| 7,751,289 B2 * | 7/2010 | Amano ....................... 369/47.53 |
| 7,773,472 B2 * | 8/2010 | Fan et al. .................... 369/47.53 |
| 2002/0136121 A1 * | 9/2002 | Salmonsen et al. ........ 369/47.53 |
| 2004/0027949 A1 * | 2/2004 | Matsuura et al. ........... 369/47.51 |
| 2005/0201228 A1 * | 9/2005 | Furukawa et al. ........... 369/47.5 |
| 2006/0245332 A1 * | 11/2006 | Shen et al. ...................... 369/94 |
| 2006/0291339 A1 * | 12/2006 | Mijirtiskii .................. 369/30.24 |
| 2006/0291351 A1 * | 12/2006 | Tomura et al. ............. 369/47.53 |
| 2007/0008850 A1 | 1/2007 | Nakajo |
| 2007/0041299 A1 * | 2/2007 | Kato ........................... 369/59.19 |
| 2007/0171787 A1 * | 7/2007 | Higashino .................... 369/47.5 |
| 2008/0259757 A1 * | 10/2008 | Tao et al. .................... 369/47.53 |
| 2009/0207705 A1 * | 8/2009 | Furumiya et al. .......... 369/47.14 |
| 2010/0202266 A1 * | 8/2010 | Miyanabe et al. ......... 369/53.19 |

FOREIGN PATENT DOCUMENTS

| JP | 2005-135481 | 5/2005 |
| JP | 2006-302332 | 11/2006 |
| JP | 2006-351127 | 12/2006 |
| JP | 2007-018582 | 1/2007 |
| JP | 2007-048412 | 2/2007 |

\* cited by examiner

*Primary Examiner* — Wayne R Young
*Assistant Examiner* — Brenda Bernardi
(74) *Attorney, Agent, or Firm* — McDermott Will & Emery LLP (57) ABSTRACT

In order to ensure recording quality while suppressing the adverse effects due to performance variations among apparatuses and disc radial positions on an optical disc, an optical disc apparatus according to the present invention performs, at the time of data recording, the steps of: acquiring a jitter value and $\beta$ value from a reproduced signal based on laser light reflected from the optical disc in relation to a disc radial position; learning a $\beta$ value when the acquired jitter value is a minimum as a target $\beta$ value; and, if a jitter value acquired thereafter is larger than the minimum jitter value by a preset reference value or above, correcting recording power based on the magnitude relation and the difference between the $\beta$ value associated with the acquired jitter value and the target $\beta$ value or performing trial record processing.

12 Claims, 10 Drawing Sheets

DISC INNER CIRCUMFERENCE SIDE

FIG. 10B

DISC OUTER CIRCUMFERENCE SIDE

OPTICAL DISC APPARATUS AND DATA RECORDING METHOD THEREOF

CLAIM OF PRIORITY

The present application claims priority from Japanese application serial No. P2007-142272, filed on May 29, 2007, the content of which is hereby incorporated by reference into this application.

BACKGROUND OF THE INVENTION

1. Technical Field of the Invention

The present invention relates to an optical disc apparatus and more particularly to a control technique of recording power at the time of data recording.

2. Description of the Related Art

In DVD recording with a conventional optical disc apparatus, in order to control laser output at the time of data recording, the optical disc apparatus performs the steps of: periodically suspending recording operation; measuring and calculating a β value of a signal recorded immediately before suspending the recording operation from a reproduced signal; comparing measurement and calculation results with a target β value prestored in the apparatus; and controlling the laser power so as to zero the difference therebetween to perform recording power correction control (referred to as Walking OPC (optimum power control)). However, the β value is not directly connected with recording quality, and the relation between the β value and the recording quality differs depending on performance variations among apparatuses, disc radial positions of an optical disc, etc. Therefore, even if the recording power is corrected so as to meet the prestored target β value, the recording quality, for example jitter, is not necessarily improved.

Further, in order to improve the recording quality of optical disc apparatuses, a technique for correcting recording parameters by use of the Time Interval Analyzer function (referred to as the TIA function) for measuring a phase error between a reproduced signal from which recording marks are read and a reference signal has been studied in recent years. Correction techniques by use of the TIA function are disclosed, for example, in JP-A-2006-302332, JP-A-2007-48412, and JP-A-2007-18582. JP-A-2006-302332 discloses a technique for preventing recording deterioration if an environmental condition such as temperature changes during data recording with a recording/reproducing apparatus. The technique includes the steps of: seeking a recordable zone on a recording medium; tentatively recording only recording parameters of a shortest recording mark by use of particular patterns with several added patterns of correction values; reproducing the patterns; and correcting the recording parameters based on the amount of edge shift of the recording mark. JP-A-2007-48412 discloses a technique for trial record processing onto a data recording medium with a data recording apparatus. The technique adjusts a parameter for changing the rising position of a first pulse of a recording strategy, a parameter for changing the rising position of a cooling pulse, and a parameter for changing the rising position of a last pulse. JP-A-2007-18582 discloses a technique for enabling the setup of a write strategy (recording strategy) with high accuracy in a short time even at the time of high-speed recording with an optical data recording apparatus. The technique includes the steps of: tentatively recording data including a plurality of types of marks onto an optical recording medium according to a predetermined write strategy; detecting a gap between edge timing and a clock for each edge of each mark whose value changes in a reproduced signal of the recorded data; and correcting the write strategy for each mark so that all gaps coincide with each other.

SUMMARY OF THE INVENTION

With each of the above-mentioned conventional techniques disclosed, the TIA function is utilized for a signal reproducing from data recorded on a trial basis (tentative recording). Therefore, the amount of edge shift of recording marks evaluated by the TIA function does not necessarily coincide with jitter characteristics of the reproduced signal of the data recorded onto a User Data Area. Further, there are many cases where jitter characteristics remarkably differ in relation to the disc radial position also in the User Data Area. Therefore, when data recording is performed by use of a recording strategy corrected based on trial record processing before data recording (tentative recording), it may not be possible to ensure a desired recording quality.

Figure 9:
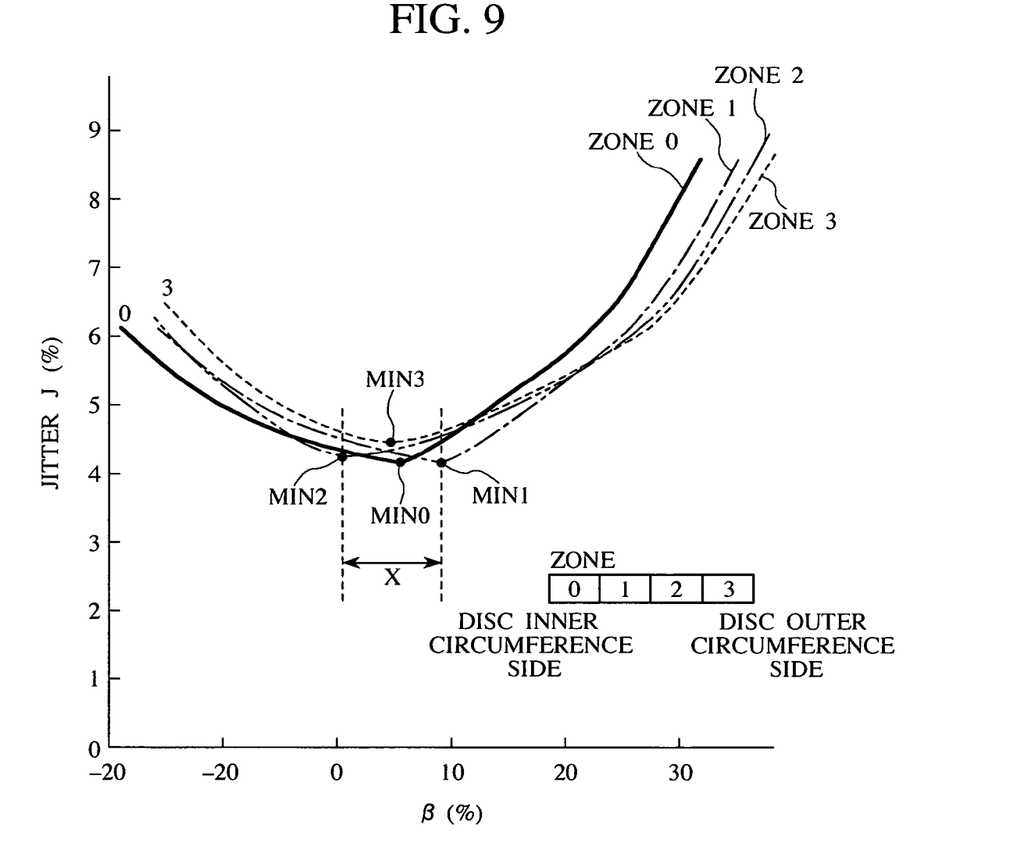
FIG. 9 is a diagram explaining an object of the present invention.
Figure 10A:
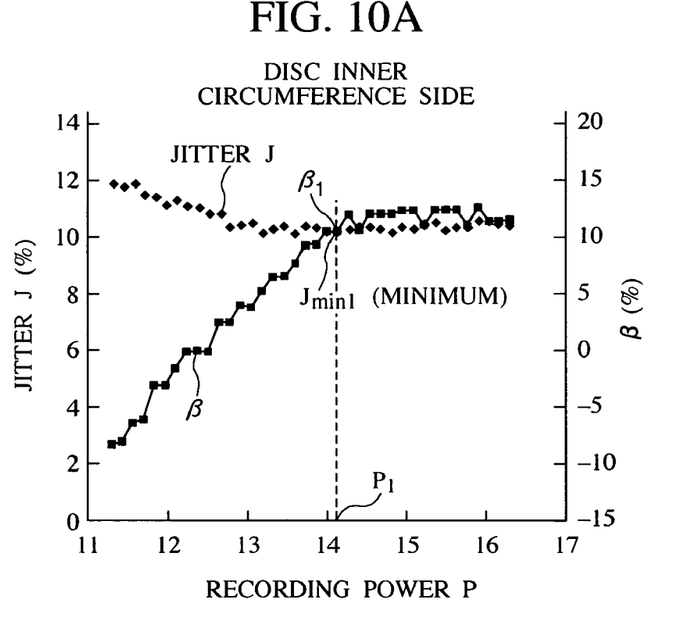
FIGS. 10A and 10B are diagrams explaining an object of the present invention.
Figure 10B:
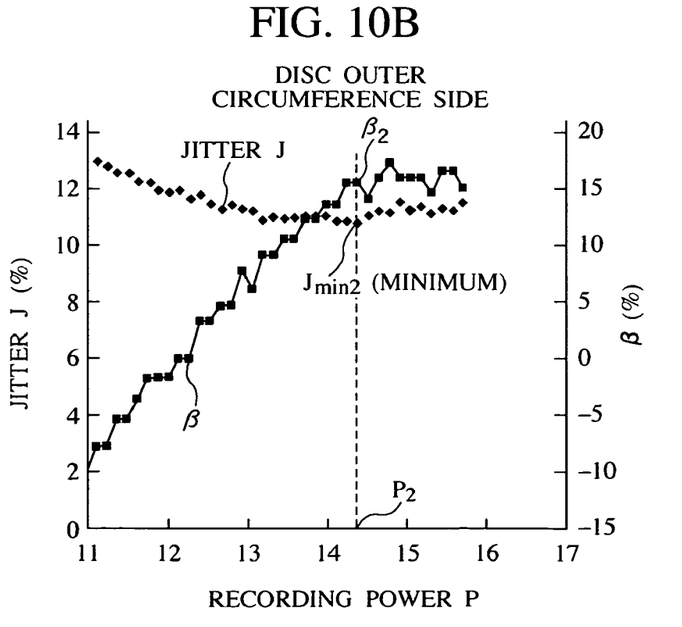

FIGS. 9 and 10 are diagrams each showing example characteristics of the β value and jitter value measured from a reproduced signal of data recorded onto the User Data Area of an optical disc. The jitter value is measured by means of the TIA function provided by a DSP (Digital Signal Processor) in an optical disc apparatus. The optical disc and the optical disc apparatus used for measurement of FIG. 9 differ from those used for measurement of FIG. 10. FIG. 9 is a diagram showing example characteristics, i.e., a relation between the β value and the jitter value J in zones at different radial positions (zones 1 to 3) on the optical disc. FIG. 10A is a diagram showing example characteristics of the β value and jitter value J with respect to the recording power P in the User Data Area on the inner circumference side of the optical disc (disc inner circumference side). FIG. 10B is a diagram showing example characteristics of the β value and jitter value J with respect to the recording power P in the User Data Area on the outer circumference side of the optical disc (disc outer circumference side). Referring to FIG. 9, zone 0 is a User Data Area which is closest to the disc inner circumference, zone 3 is a User Data Area which is closest to the disc outer circumference, and zones 1 and 2 are User Data Areas between zones 0 and 3. Referring to measured characteristics of FIG. 9, the characteristic curves in each of zones 0 to 3 differ from each other. In particular, a minimum value of the jitter value in zone 0, MIN0, a minimum value of the jitter value in zone 1, MIN1, a minimum value of the jitter value in zone 2, MIN2, and a minimum value of the jitter value in zone 3, MIN3, are different from each other, and each corresponds to different β values. Further, referring to FIG. 10, on the disc inner circumference side, the jitter value J takes a minimum value $J_{min1}$ when the recording power P is $P_1$ and the β value is $β_1$; on the disc outer circumference side, the jitter value J takes a minimum value $J_{min2}$ ($J_{min2}$>$J_{min1}$) when the recording power P is $P_2$ ($P_2$>$P_1$) and the β value is $β_2$ ($β_2$>$β_1$). Thus, jitter characteristics, β value characteristics, and correlation characteristics between the jitter value and the β value, etc. greatly differ depending on performance variations among apparatuses, disc radial positions (zones) of the optical disc, etc.

A problem to be tackled by the present invention is to enable an optical disc apparatus to perform data recording with the recording power in which the adverse effects due to performance variations among apparatuses, performance variations due to disc radial positions (zones) of the optical disc, etc. are suppressed, taking the above-mentioned situations of the conventional techniques into consideration.

An object of the present invention is to solve the above-mentioned problem and provide an optical disc apparatus that can stably ensure recording quality.

The present invention is the technique that can solve the above-mentioned problem and accomplish the above-mentioned object.

Specifically, at the time of data recording, an optical disc apparatus according to the present invention performs the steps of: acquiring a jitter value and a β value from a reproduced signal based on laser light reflected from an optical disc in relation to a disc radial position; learning a β value when the acquired jitter value is a minimum as a target β value; and, if a jitter value acquired thereafter is larger than the minimum jitter value by a preset reference value or above, correcting recording power based on the magnitude relation and the difference between the β value associated with the acquired jitter value and the target β value or performing trial record processing.

DETAILED DESCRIPTION OF THE PREFERRED EMBODIMENT

Embodiments of the present invention will be explained below with reference to the accompanying drawings.

Figure 1:
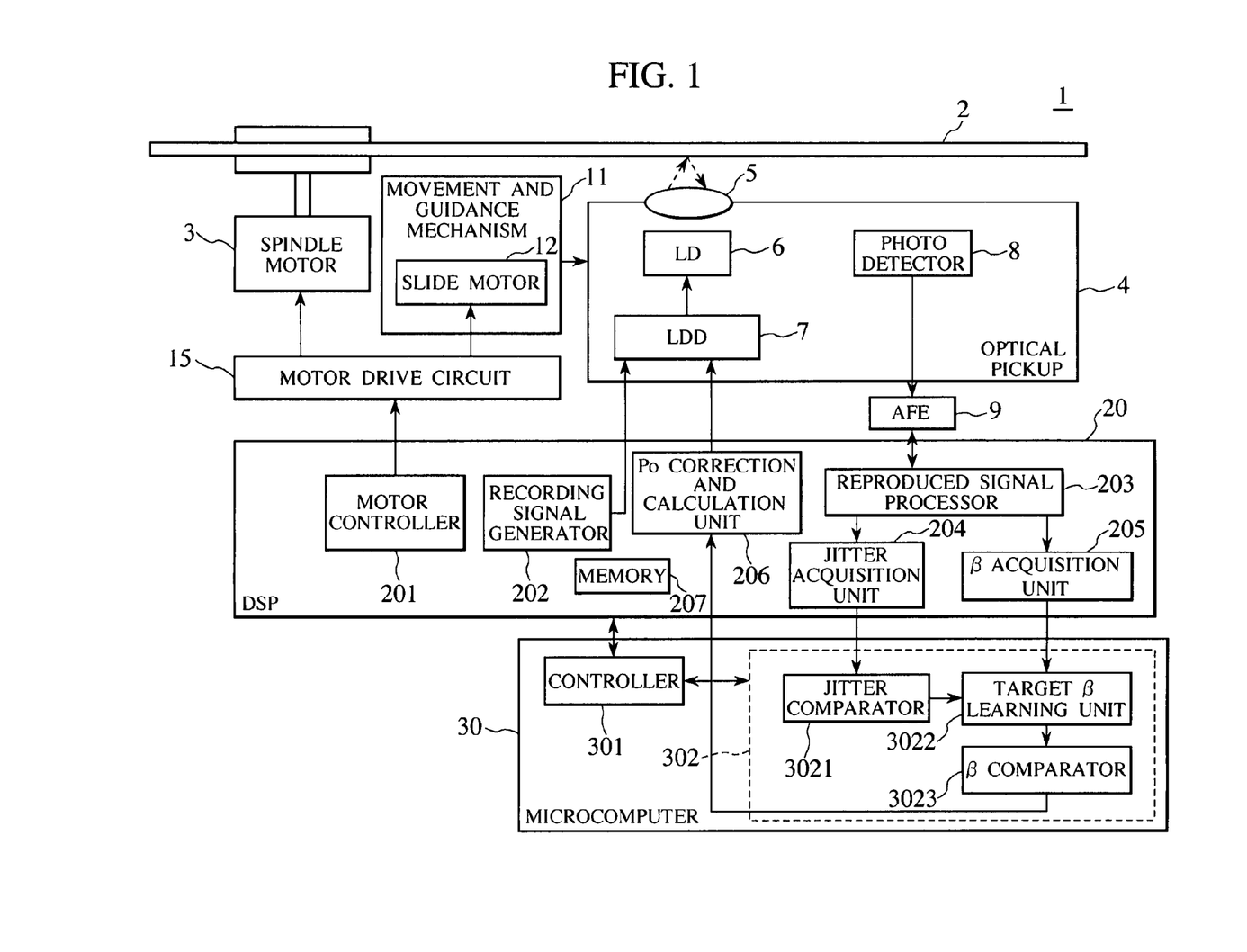
FIG. 1 is a diagram showing the configuration of an optical disc apparatus according to an embodiment of the present invention.
Figure 2:
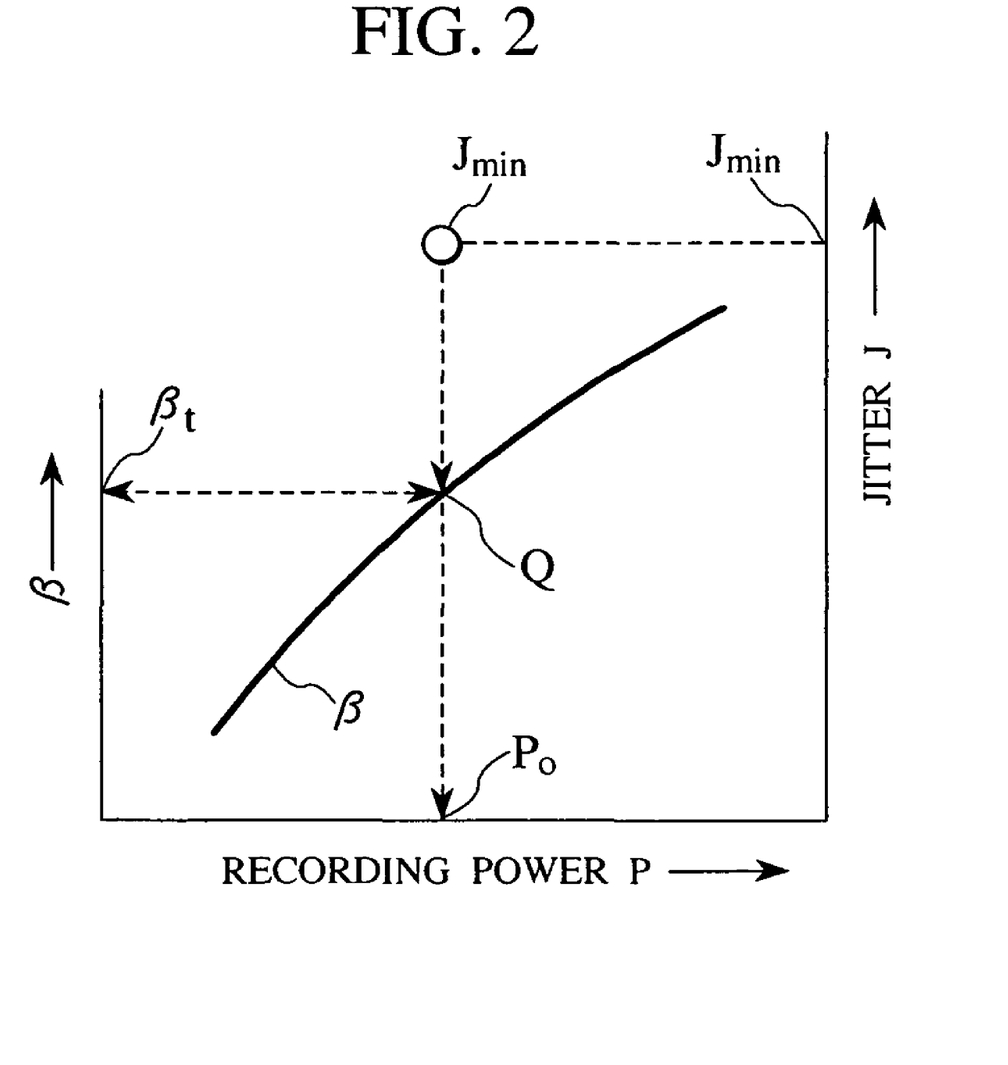
FIG. 2 is a diagram explaining a target β value and recording power with the optical disc apparatus of FIG. 1.
Figure 3:
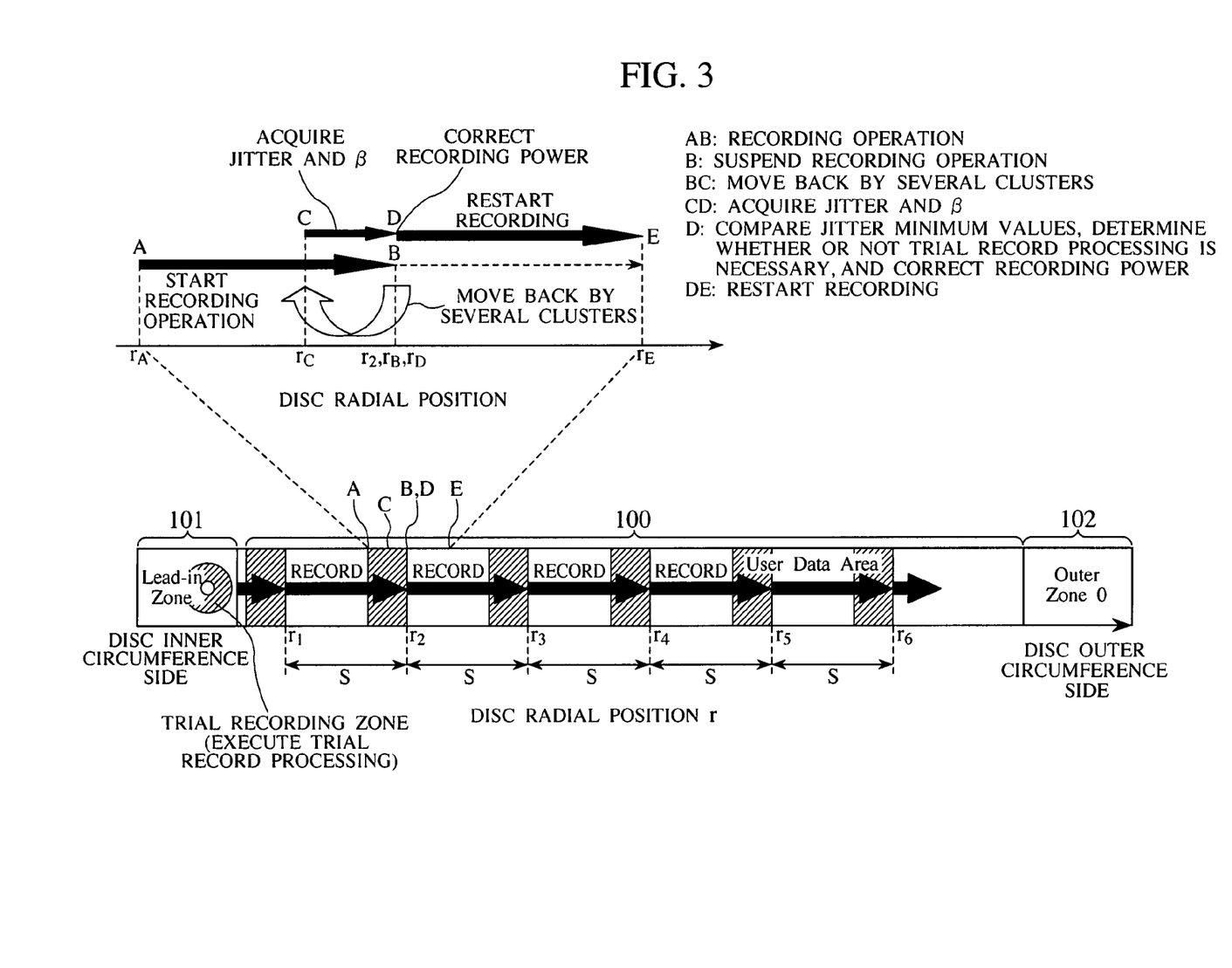
FIG. 3 is a diagram explaining recording operations at each disc radial position with the optical disc apparatus of FIG. 1.
Figure 4:
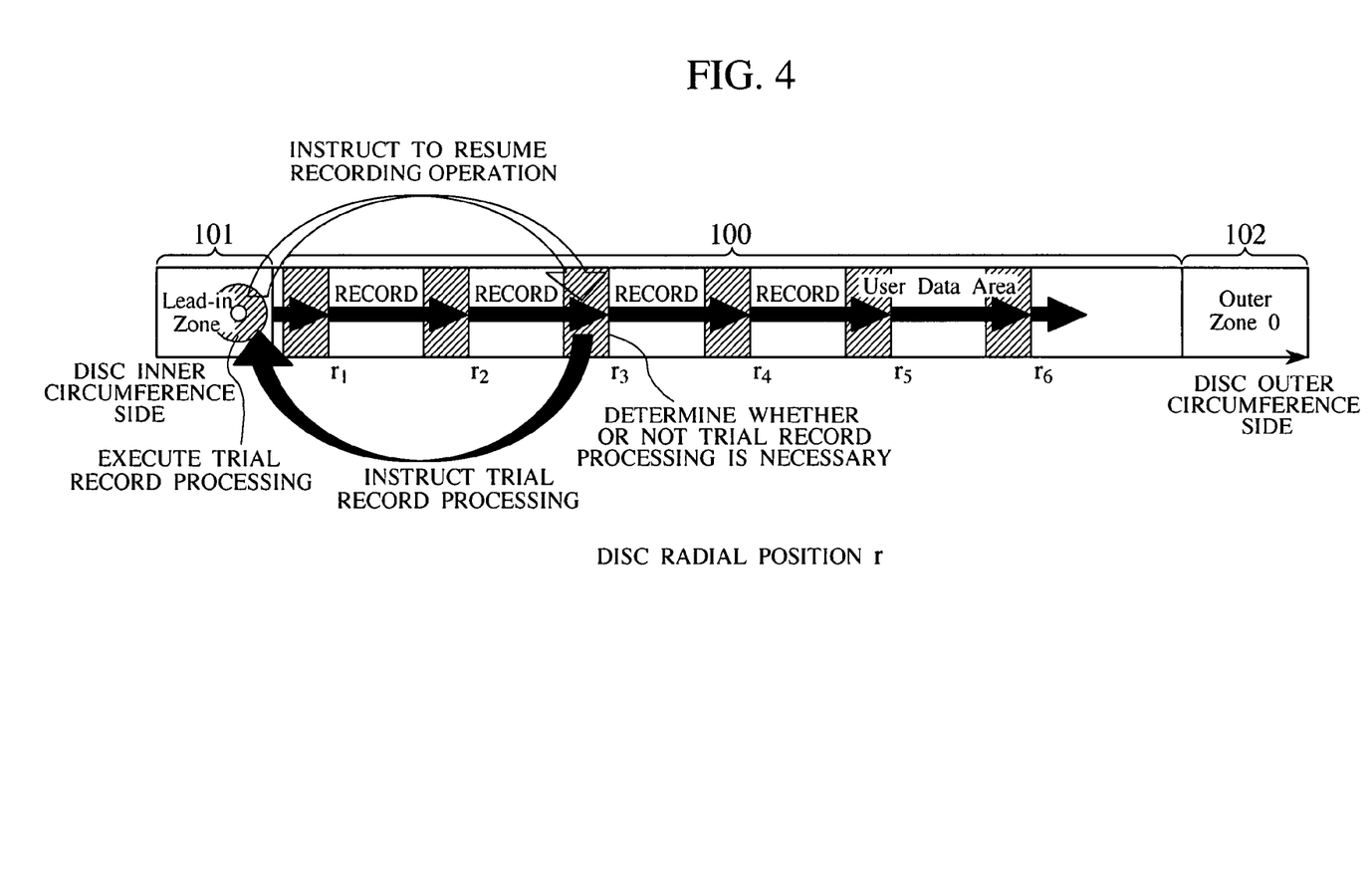
FIG. 4 is a diagram explaining the case where trial record processing is performed during data recording by the optical disc apparatus of FIG. 1.
Figure 5:
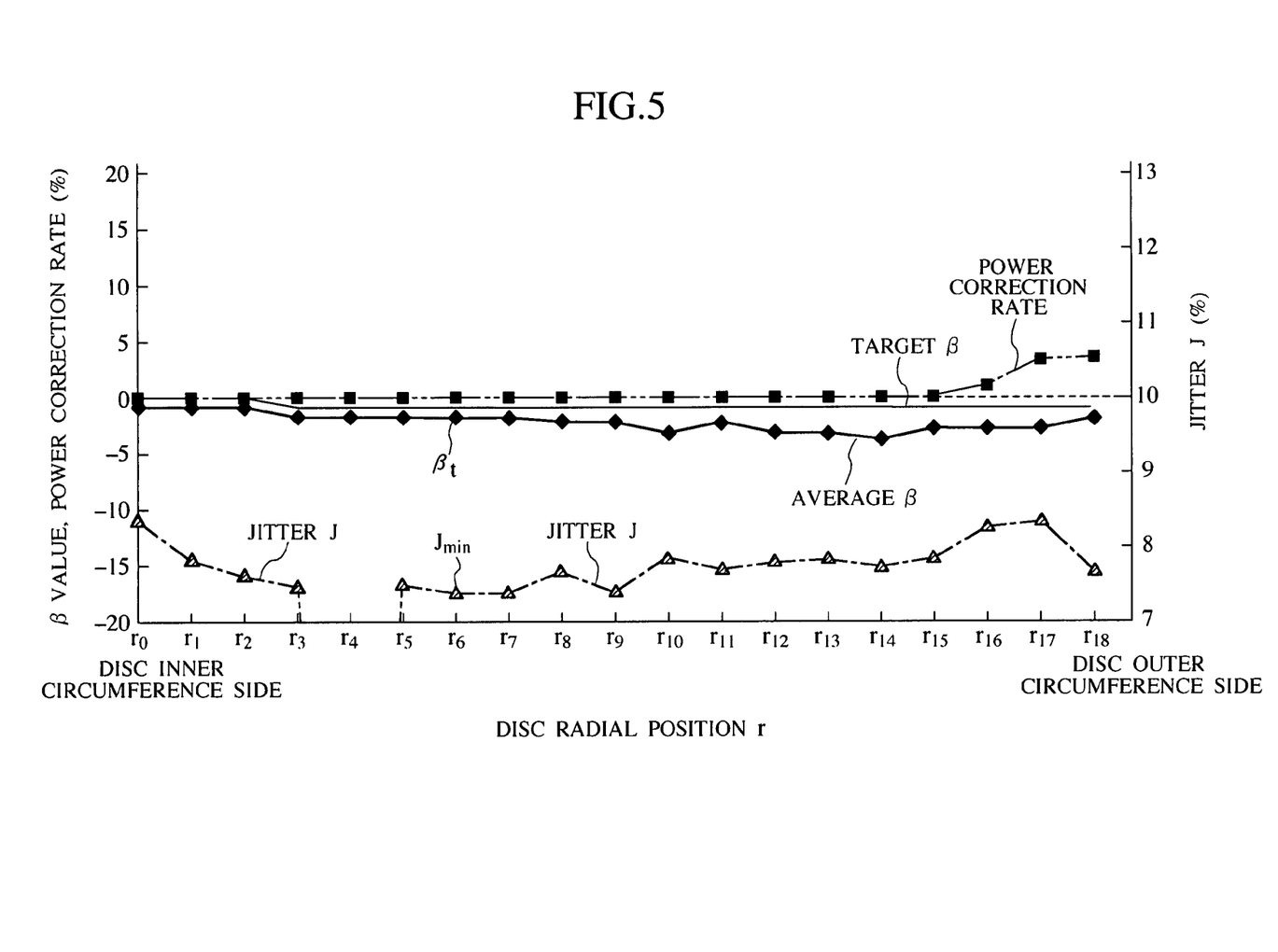
FIG. 5 is a diagram showing example characteristics of recording operation by the optical disc apparatus of FIG. 1.
Figure 6:
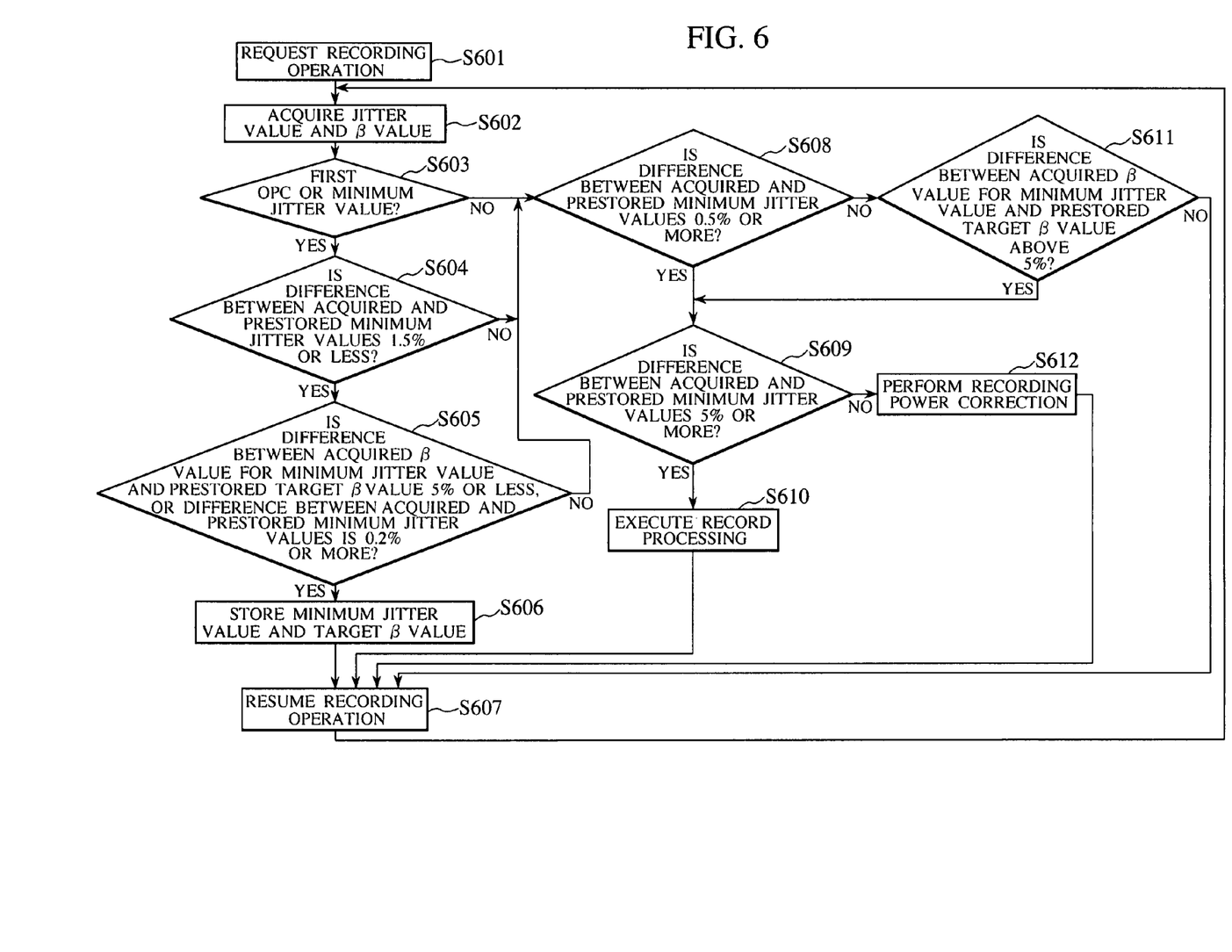
FIG. 6 is a diagram showing an operation flow of the optical disc apparatus of FIG. 1.
Figure 7:
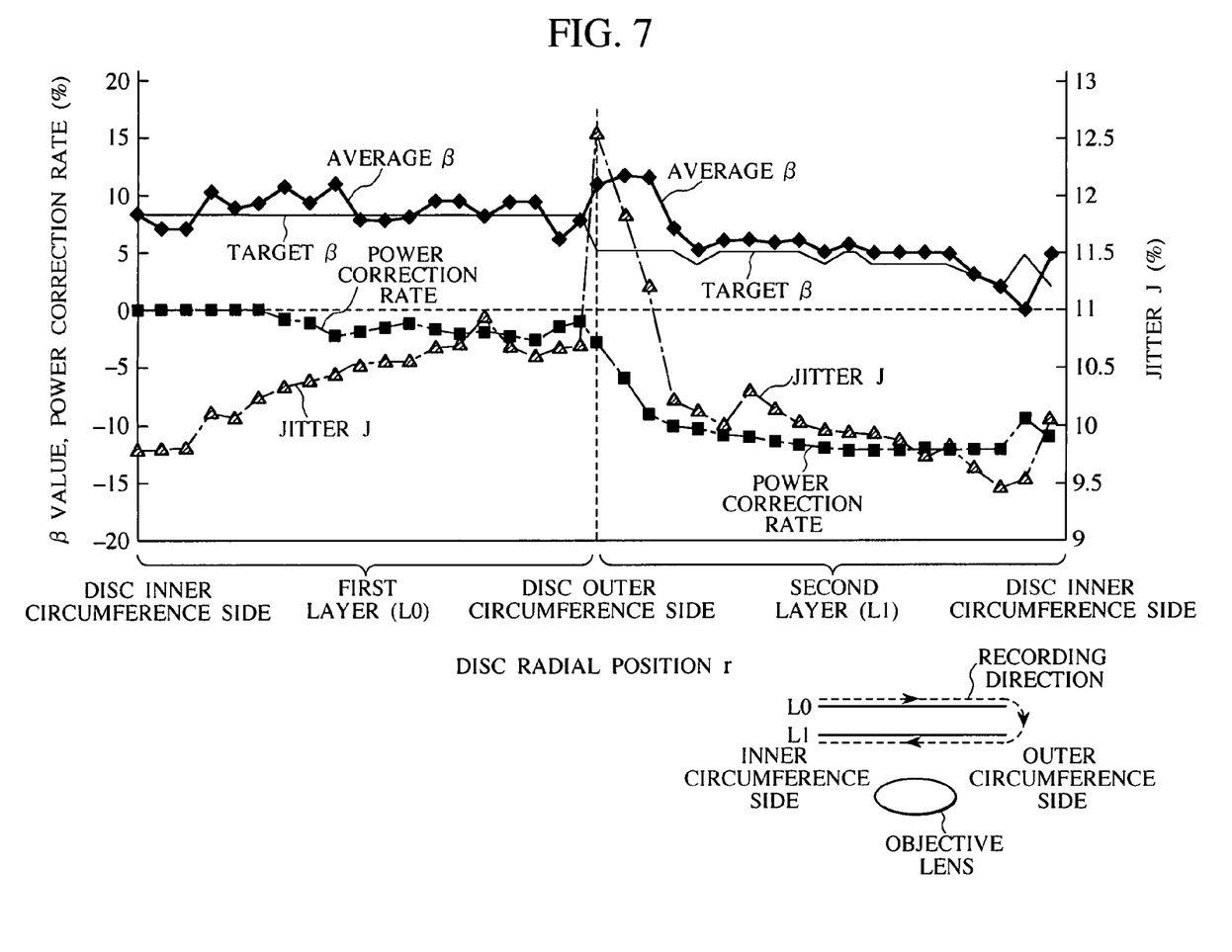
FIG. 7 is a diagram showing example characteristics of recording operation for a two-layer disc by the optical disc apparatus of FIG. 1.

FIG. 1 is a diagram showing a configuration of the optical disc apparatus according to an embodiment of the present invention; FIG. 2, a diagram explaining a target β value and recording power with the optical disc apparatus of FIG. 1; FIG. 3, a diagram explaining recording operation at each disc radial position with the optical disc apparatus of FIG. 1; FIG. 4, a diagram explaining a case where trial record processing is performed during data recording by the optical disc apparatus of FIG. 1; FIG. 5, a diagram showing example characteristics of recording operation by the optical disc apparatus of FIG. 1; FIG. 6, a diagram showing an operation flow of the optical disc apparatus of FIG. 1; FIG. 7, a diagram showing example characteristics of recording operation for a two-layer disc by the optical disc apparatus of FIG. 1; and FIG. 8, a diagram showing example characteristics of recording operation for the two-layer disc by the optical disc apparatus of FIG. 1 in a case where recording power correction is not performed.

Referring to FIG. 1, the optical disc apparatus 1 according to an embodiment of the present invention includes an optical disc 2 (a DVD, a blue laser disc, etc.), a spindle motor 3, an optical pickup 4, an objective lens 5, a laser diode 6, a laser drive circuit 7, a photo detector 8, an analog front end 9, a movement and guidance mechanism 11, a slide motor 12, and a motor drive circuit 15. The spindle motor 3 rotatively drives the optical disc 2. The laser diode 6 generates laser light having a predetermined light intensity or quantity for recording/reproducing operation. The laser drive circuit 7 drives the laser diode 6. The photo detector 8 receives laser light reflected from a recording surface of the optical disc 2 (hereinafter referred to as an optical disc surface) through the objective lens 5 and converts it to an electrical signal for output. The analog front end 9 amplifies the signal from the photo detector 8 and performs other analog processing. The movement and guidance mechanism 11 composed of a straight guide member (not shown), a lead screw member (not shown), etc. moves the optical pickup 4 in an approximately radial direction of the optical disc 2. The slide motor 12 provided in the movement and guidance mechanism 11 rotatively drives the lead screw member (not shown). The motor drive circuit 15 drives the spindle motor 3, the slide motor 12, etc.

Further, the optical disc apparatus 1 includes a DSP 20, a motor controller 201, a recording signal generator 202, a reproduced signal processor 203, a jitter acquisition unit 204, a β acquisition unit 205, a recording power correction and calculation unit 206, and a memory 207. The motor controller 201 provided in the DSP 20 controls the motor drive circuit 15. The recording signal generator 202 also provided in the DSP 20 generate a recording signal. The reproduced signal processor 203 also provided in the DSP 20 processes a reproduced signal from the photo detector 8 as a RF signal, a tracking error signal, or a focus error signal. The jitter acquisition unit 204 provided in the DSP 20 functions as jitter acquisition means for measuring a jitter value, for example, by means of the TIA function, from a reproduced signal outputted from the reproduced signal processor 203. The β acquisition unit 205 provided in the DSP 20 functions as β acquisition means for acquiring, through measurements and calculations, the β value of a recording mark recorded on the optical disc 2 from a reproduced signal from the reproduced signal processor 203. The recording power correction and calculation unit 206 functions as recording power correction and calculation means for calculating a recording power correction quantity or correction rate based on the acquired β value. The β acquisition unit 205 measures a maximum level $a_1$ and a minimum level $a_2$ of the reproduced signal and calculates the ratio of the sum of both levels to the difference therebetween, i.e., $(a_1+a_2)/(a_1-a_2)$ as a β value. The motor controller 201, the recording signal generator 202, the reproduced signal processor 203, the jitter acquisition unit 204, the β acquisition unit 205, and the recording power correction and calculation unit 206 are each formed as an electronic circuit in the DSP 20.

Further, the optical disc apparatus 1 includes a microcomputer 30, a controller 301, a signal comparison and learning unit 302, a jitter comparator 3021, a target β learning unit 3022, and a β comparator 3023. The microcomputer 30 controls the DSP 20. The controller 301 provided in the microcomputer 30 functions as control means. The signal comparison and learning unit 302 provided in the microcomputer 30 functions as signal comparison and learning means. The jitter comparator 3021 provided in the signal comparison and learning unit 302 functions as jitter comparison means for comparing the jitter value acquired by the jitter acquisition unit 204 with a jitter value already acquired and at the same time determining a minimum jitter value. The target β learning unit 3022 also provided in the signal comparison and learning unit 302 functions as target β learning means for learning a β value associated with the minimum jitter value as a target β value for recording power control. The β comparator 3023 compares a β value acquired after learning the target β value with the target β value. The controller 301, the jitter comparator 3021, the target β learning unit 3022, and the β comparator 3023 are each formed as an electronic circuit in the microcomputer 30. The controller 301 controls the entire optical disc apparatus 1 including the signal comparison and learning unit 302 in the microcomputer 30, the components (including the memory 207) in the DSP 20, the laser drive circuit 7, etc. The determined minimum jitter value and the learned target β value are stored in the memory 207 in the DSP 20 through control by the controller 301. The minimum jitter value and the target β value stored are updated each time the determination or learning operation is performed.

The recording power correction and calculation unit 206 calculates the recording power correction quantity or correction rate based on the result of comparison by the β comparator 3023. Specifically, when the β value acquired by the β acquisition unit 205 after learning the target β value is $β_e$ and the target β value already learned by the target β learning unit and stored in the memory 207 is $β_t$, the β comparator 3023 controlled by the controller 301 compares both of the β values and outputs a signal corresponding to the difference between the two β values, $|β_t-β_e|$. The recording power correction and calculation unit 206 calculates the recording power correction quantity or correction rate according to the signal, i.e., the difference $|β_t-β_e|$. The resulting signal is inputted to the laser drive circuit 7. The laser drive circuit 7 generates a drive signal based on the calculation result signal and drives the laser diode 6 with the drive signal to emit laser light corresponding to the recording power corrected with the correction quantity or correction rate from the laser diode 6.

At the time of data recording, the controller 301 instructs the optical disc apparatus 1 to suspend recording operation at preset intervals of time or radial distance and performs correction control of the recording power (optimum power control: hereinafter referred to as OPC) at each of a plurality of disc radial positions at which recording operation is suspended. Specifically, at each of the plurality of disc radial positions, the controller 301 stops the output of the recording operation drive signal from the laser drive circuit 7 to the laser diode 6. At the same time, the controller 301 controls the recording signal generator 202 to stop the generation and output of the recording signal and controls the motor controller 201 to stop the slide motor 12, thereby stopping the operation of the movement and guidance mechanism 11. In this case, the controller 301 instructs the jitter acquisition unit 204 to acquire a jitter value in relation to each disc radial position, i.e., a jitter value immediately before a suspension of record processing; instructs the β acquisition unit 205 to acquire a β value in relation to each disc radial position, i.e., a β value immediately before a suspension of record processing; and instructs the jitter comparator 3021 to compare the acquired jitter value with the minimum jitter value prestored in the memory 207 to determine a minimum jitter value in relation to each disc radial position. Further, the controller 301 instructs the target β learning unit 3022 to learn a target β value associated with the minimum jitter value; and instructs the memory 207 to store the determined minimum jitter value and the learned target β value.

During data recording, at each of a plurality of disc radial positions, the controller 301 compares jitter values to determine a minimum jitter value, learns a target β value based on the determination result, and corrects the recording power based on the target β value or performs trial record processing again. Specifically, when suspending recording operation at each of the plurality of disc radial positions at the time of data recording, if the acquired jitter value is larger than the minimum jitter value prestored in the memory 207 and the difference therebetween is equal to or larger than a preset first reference value and less than a preset second reference value as a result of jitter value comparison by the jitter comparator 3021, the controller 301 instructs the recording power correction and calculation unit 206 to calculate a recording power correction quantity or correction rate based on the magnitude relation and the difference between the β value associated with the acquired jitter value and the target β value and instructs the laser drive circuit 7 to emit laser light having the recording power corrected according to the calculation result from the laser diode 6. The controller 301 performs the recording power correction so that the corrected recording power satisfies the target β value. Specifically, if the acquired β value is larger than the target β value, the controller 301 decreases the recording power according to the difference between the two β values; in contrast, if the acquired β value is smaller than the target β value, the controller 301 increases the recording power according to the difference between the two β values to reduce the jitter value. Further, if the difference is equal to or larger than the second reference value, the controller 301 forms and outputs a signal for designating trial record processing.

Further, when suspending recording operation at each of the plurality of disc radial positions at the time of data recording, if the acquired jitter value is larger than the minimum jitter value prestored in the memory 207 and the difference therebetween is equal to or smaller than a preset reference value as a result of jitter value comparison by the jitter comparator 3021, and further if the acquired β value is larger than the target β value and exceeds a preset reference value as a result of the β value comparison by the β comparator 3023, the controller 301 instructs the recording power correction and calculation means to calculate a recording power correction quantity or correction rate based on the magnitude relation and the difference between the β value associated with the acquired jitter value and the target β value and instructs the optical disc apparatus to perform recording power correction based on the calculation result.

Further, if the acquired jitter value is larger than the minimum jitter value and the difference therebetween exceeds the reference value as a result of the jitter value comparison, the controller 301 forms and outputs a signal for designating trial record processing.

After the recording power correction and calculation unit 206 has calculated the recording power correction quantity or correction rate in each of the above-mentioned cases, the controller 301 controls the entire optical disc apparatus 1 including the microcomputer 30 to resume recording operation. Specifically, the controller 301 controls the motor controller 201 to resume the rotation of the slide motor 12 to drive again the movement and guidance mechanism 11 to resume the movement of the optical pickup 4. At the same time, the controller 301 controls the recording signal generator 202 to generate and output a recording signal, controls the laser drive circuit 7 to emit laser light corresponding to the corrected recording power from the laser diode 6, and controls the optical disc apparatus 1 to resume recording operation with the corrected recording power. Further, in a state before the optical disc apparatus 1 starts recording operation for the first time, the controller 301 controls the optical disc apparatus 1 to set the recording power by use of the β value prestored in the memory 207.

In the following explanations, the same symbols as those of FIG. 1 are assigned to the same components of the optical disc apparatus 1 of FIG. 1.

FIG. 2 is a diagram explaining a target β value and recording power with the optical disc apparatus 1 of FIG. 1.

In FIG. 2, the horizontal axis is assigned recording power P to be applied to the recording surface of the optical disc 2, and the vertical axes are assigned the β value and jitter value J of recording marks on the recording surface of the optical disc 2. When recording operation during data recording with the optical disc apparatus 1 is suspended, if a minimum jitter value $J_{min}$ is acquired through comparison and determination by the jitter comparator 3021, a β value associated with the minimum jitter value $J_{min}$ is learned as a target β value $β_t$ by the target β learning unit 3022, and further the recording power corresponding to the target β value $β_t$ is set as target recording power Po by the controller 301. In FIG. 2, Q is a point on a β characteristic curve corresponding to a β value associated with the minimum jitter value $J_{min}$, i.e., a target β value.

FIG. 3 is a diagram explaining recording operation at each of a plurality of disc radial positions on the optical disc 2 in the optical disc apparatus 1 of FIG. 1.

At each of a plurality of disc radial positions at preset intervals of time or radial distance, the optical disc apparatus 1 performs the steps of: suspending recording operation; acquiring and comparing jitter values; determining a minimum jitter value; acquiring a β value; learning a target β value; determining whether or not recording power correction is necessary; calculating a recording power correction rate; determining whether or not trial record processing is necessary; and resuming the recording operation.

Referring to FIG. 3, reference numeral 100 denotes a User Data Area on the recording surface of the optical disc 2; 101, a Lead-in Zone provided on the disc inner circumference side; 102, an Outer Zone provided on the disc outer circumference side. Reference symbols $r_1$, $r_2$, $r_3$, $r_4$, $r_5$, $r_6$, . . . denote disc radial positions in the User Data Area 100 at which recording operation is suspended; S, an interval between adjacent disc radial positions, i.e., a radial distance between positions at which recording operation is suspended. With the optical disc apparatus 1, the radial distance is assumed to be the same for each interval between adjacent disc radial positions. Further, A to E denote operation time points, and $r_A$ to $r_E$ are disc radial positions corresponding to the time points A to E, respectively. For example, when the optical disc apparatus 1 performs recording operation in a zone between disc radial positions $r_1$ and $r_2$ on the optical disc 2, the controller 301 instructs the optical disc apparatus 1 to suspend the recording operation at the disc radial position $r_2$ and perform OPC. Specifically, the controller 301 controls the optical disc apparatus 1 to continue recording operation at a time point A (disc radial position $r_A$), suspends the recording operation at a time point B, and radially moves the optical pickup 4 inward from the disc radial position $r_B$ at the time point B for example by a distance of several clusters (a cluster is a minimum record unit of a Blu-ray Disc), i.e., to a disc radial position $r_C$ (at a time point C). Subsequently, the controller 301 radially moves the optical pickup 4 outward by a distance of the same number of Clusters as above, i.e., to a disc radial position $r_D$ (at a time point D) (It is assumed that the disc radial position $r_D$ coincides with the disc radial position $r_B$.). During the movement of the optical pickup between the time point C and the time point D, the controller 301 controls the reproduced signal processor 203 to reproduce the data written immediately before the suspension of record processing, controls the jitter acquisition unit 204 to acquire a jitter value from the reproduced signal, and controls the β acquisition unit to acquire a β value.

At the disc radial position $r_D$ at the time point D, the controller 301 controls the jitter comparator 3021 to compare the acquired jitter value with the minimum jitter value prestored in the memory 207 to determine a minimum jitter value in relation to each disc radial position. Further, the controller 301 controls the target β learning unit 3022 to learn a target β value associated with the minimum jitter value and controls the memory 207 to store the determined minimum jitter value and the learned target β value. Further, at the disc radial position $r_D$, if the acquired jitter value is larger than the minimum jitter value prestored in the memory 207, larger than a preset first reference value, and less than a preset second reference value as a result of jitter value comparison by the jitter comparator 3021, the controller 301 instructs the recording power correction and calculation unit 206 to calculate a recording power correction quantity or correction rate based on a target β value associated with the minimum jitter value and controls the optical disc apparatus 1 to perform recording power correction. Subsequently, the controller 301 instructs the laser drive circuit 7 to emit laser light having the corrected recording power from the laser diode 6 to resume recording operation from the disc radial position $r_D$.

Further, at the disc radial position $r_D$, the controller 301 also determines whether or not trial record processing is necessary based on the result of jitter value comparison by the jitter comparator 3021. Specifically, if the acquired jitter value is equal to or larger than the second reference value as a result of the jitter value comparison, the controller 301 determines that trial record processing is necessary and forms and outputs a signal for designating trial record processing.

FIG. 4 is a diagram explaining a case where trial record processing is performed during data recording with the optical disc apparatus 1 of FIG. 1.

Referring to FIG. 4, at a disc radial position $r_3$ in the User Data Area 100 at which recording operation is suspended for example, if the acquired jitter value is equal to or larger than the second reference value as a result of jitter value comparison by the jitter comparator 3021, the controller 301 forms a signal for designating trial record processing, controls the motor controller 201 to rotate the slide motor 12 thereby driving the movement and guidance mechanism 11 to move the optical pickup 4 to a disc radial position corresponding to a trial recording zone in the Lead-in Zone 101 of the optical disc 2. At the disc radial position, the controller 301 controls the optical disc apparatus 1 to perform trial record processing to the trial recording zone. The controller 301 controls the optical disc apparatus 1 to perform the trial record processing under the same conditions as those for trial record processing performed before it starts recording operation for the first time. After the trial record processing is completed, the controller 301 controls again the motor controller 201 to rotate the slide motor 12 thereby driving the movement and guidance mechanism 11 to move the optical pickup 4 to the disc radial position $r_3$ of the optical disc 2 and controls the optical disc apparatus 1 to resume data recording operation at the disc radial position $r_3$.

FIG. 5 is a diagram showing example characteristics of recording operation by the optical disc apparatus 1 of FIG. 1. With the characteristics of FIG. 5, recording operation is suspended at a plurality of disc radial positions of the optical disc 2, as shown in FIG. 3. FIG. 5 shows results of simulation where, at each suspended position, the optical disc apparatus 1 performs the steps of: acquiring and comparing jitter values; determining a minimum jitter value; acquiring a β value; learning a target β value; determining whether or not recording power correction is necessary; and calculating a recording power correction rate.

In FIG. 5, the horizontal axis is assigned the disc radial position r, and the vertical axis is assigned the jitter value J, the β value, and the correction rate of the recording power. For example, since the jitter value at a disc radial position $r_1$ is smaller than that at a disc radial position $r_0$ by 0.5% (preset reference value) or above, the β value acquired at the disc radial position $r_1$ is learned as a target β value. However, since there is no increase in the jitter values thereby not affecting recording quality, the recording power correction rate is set to zero and accordingly recording power correction is not performed. This also applies to disc radial positions $r_2$ and $r_3$. Further, at a disc radial position $r_4$, the jitter value is extremely small, 7% (preset reference value) or below, which is attributable to a read error in the jitter acquisition unit 204. This jitter value is ignored, and the jitter value acquired at the disc radial position $r_3$ is substituted for a jitter value at the disc radial position $r_4$. Also in this case, the recording power correction rate is set to zero.

Further, in FIG. 5, the jitter value acquired at a disc radial position $r_6$ is smaller than any other jitter values, and this jitter value is recognized as a minimum jitter value $J_{min}$ at the disc radial position $r_6$ and subsequent zones. Further, the β value at the disc radial position $r_6$ is learned as a target β value $β_t$ at the disc radial position $r_6$ and subsequent zones. The minimum jitter value $J_{min}$ and the target β value $β_t$ are stored in the memory 207. For example, at a disc radial position $r_{16}$, the jitter value is larger than the minimum jitter value $J_{min}$ at the disc radial position $r_6$ by 0.5% (preset reference value) or above, and degraded recording quality is therefore assumed. Accordingly, a recording power correction rate is calculated based on the target β value $β_t$ learned at the disc radial position $r_6$ to perform recording power correction. Specifically, since the β value acquired at the disc radial position $r_{16}$ is lower than the target β value β a recording power correction rate according to the difference between the acquired β value and the target β value $β_t$ is calculated, and based on this, recording power correction is performed so as to increase recording power. This also applies to a disc radial position $r_{17}$.

FIG. 6 is a diagram showing an operation flow of the optical disc apparatus 1 of FIG. 1.

Referring to FIG. 6, (1) When an instruction signal for requesting record processing is outputted from a host computer (not shown) (Step S601), the controller 301 in the microcomputer 30 receives the instruction signal through an interface (not shown) and suspends recording operation. At the same time, the controller 301 instructs the jitter acquisition unit 204 in the record DSP 20 to acquire a jitter value from a reproduced signal and instructs the β acquisition unit to acquire a β value (Step S602).

(2) The controller 301 determines whether or not recording power correction to be subsequently performed by the optical disc apparatus 1 is the first OPC. At the same time, the controller 301 instructs the jitter comparator 3021 to determine whether or not the jitter value acquired by the jitter acquisition unit 204 is a minimum value (Step S603).

(3) If the recording power correction to be subsequently performed is the first OPC or if the acquired jitter value is a minimum value as a result of determination in Step S603, the controller 301 instructs the jitter comparator 3021 to determine whether or not the difference between the acquired minimum jitter value and the minimum jitter value prestored in the memory 207 is equal to or smaller than a preset reference value, for example, 1.5% (Step S604).

(4) If the difference between the acquired jitter value and the prestored minimum jitter value is 1.5% or below as a result of the determination in Step S604, the controller 301 instructs the β comparator 3023 to determine whether or not the difference between the acquired β value associated with the acquired minimum jitter value and the target β value prestored in the memory 207 is equal to or smaller than a preset reference value, for example, 5%. At the same time, the controller 301 instructs the jitter comparator 3021 to determine whether or not the difference between the acquired minimum jitter value and the prestored minimum jitter value is equal to or larger than a preset reference value, for example, 0.2% (Step S605).

(5) If the difference between the acquired β value and the target β value is 5% or below or if the difference between the acquired minimum jitter value and the prestored minimum jitter value is 0.2% or above as a result of the determination in Step S605, the controller 301 instructs the memory 207 to store the acquired minimum jitter value as an updated new minimum jitter value. At the same time, the controller 301 instructs the target β learning unit to learn the acquired β value associated with the acquired minimum jitter value as a target β value and instructs the memory 207 to store the target β value (Step S606).

(6) The controller 301 instructs the optical disc apparatus 1 to resume recording operation (Step S607).

(7) If the recording power correction to be subsequently performed is not the first OPC or if the acquired jitter value is not a minimum value as a result of the determination in Step S603, if the difference between the acquired jitter value and the prestored minimum jitter value is not 1.5% or below as a result of the determination in Step S604, or if the difference between the acquired β value and the target β value exceeds a preset reference value, for example, 5% or if the difference between the acquired minimum jitter value and the prestored minimum jitter value is less than a preset reference value, for example, 0.2% as a result of the determination in Step S605, the controller 301 instructs the jitter comparator 3021 to determine whether or not the difference between the acquired minimum jitter value and the minimum jitter value prestored in the memory 207 is equal to or larger than, for example, 0.5% (preset first reference value) (Step S608).

(8) If the difference between the acquired minimum jitter value and the minimum jitter value prestored in the memory 207 is 0.5% or above as a result of the determination in Step S608, the controller 301 further instructs the jitter comparator 3021 to determine whether or not the difference between the acquired minimum jitter value and the minimum jitter value prestored in the memory 207 is equal to or larger than, for example, 5% (preset second reference value) (Step S609).

(9) If the difference between the acquired minimum jitter value and the minimum jitter value prestored in the memory 207 is 5% or above as a result of the determination in Step S609, the controller 301 issues an instruction of trial record processing to instruct the optical disc apparatus 1 to perform trial record processing onto the trial recording zone of the optical disc 2 (Step S610).

(10) The controller 301 instructs the optical disc apparatus 1 to resume recording operation based on the result of the trial record processing (Step S607).

(11) If the difference between the acquired minimum jitter value and the minimum jitter value prestored in the memory 207 is less than 0.5% as a result of the determination in Step S608, the controller 301 instructs the β comparator 3023 to determine whether or not the difference between the acquired β value associated with the acquired minimum jitter value and the target β value prestored in the memory 207 exceeds a preset reference value, for example, 5% (Step S611).

(12) If the difference between the acquired β value associated with the acquired minimum jitter value and the target β value prestored in the memory 207 exceeds 5% as a result of the determination in Step S611, the controller 301 proceeds to the processing of Step S609.

(13) If the difference between the acquired β value associated with the acquired minimum jitter value and the target β value prestored in the memory 207 is 5% or below as a result of the determination in Step S611, the controller 301 instructs the optical disc apparatus 1 to resume recording operation (Step S607).

(14) Further, if the difference between the acquired minimum jitter value and the minimum jitter value prestored in the memory 207 is 5% or below as a result of the determination in Step S609, the controller 301 issues an instruction of recording power correction to instruct the optical disc apparatus 1 to perform recording power correction (Step S612).

(15) The controller 301 instructs the optical disc apparatus 1 to resume recording operation with the corrected recording power (Step S607).

The procedures in each of the above-mentioned cases are automatically executed by the microcomputer 30 according to a program stored in memory means, such as the memory 207 provided in the optical disc apparatus 1.

Figure 8:
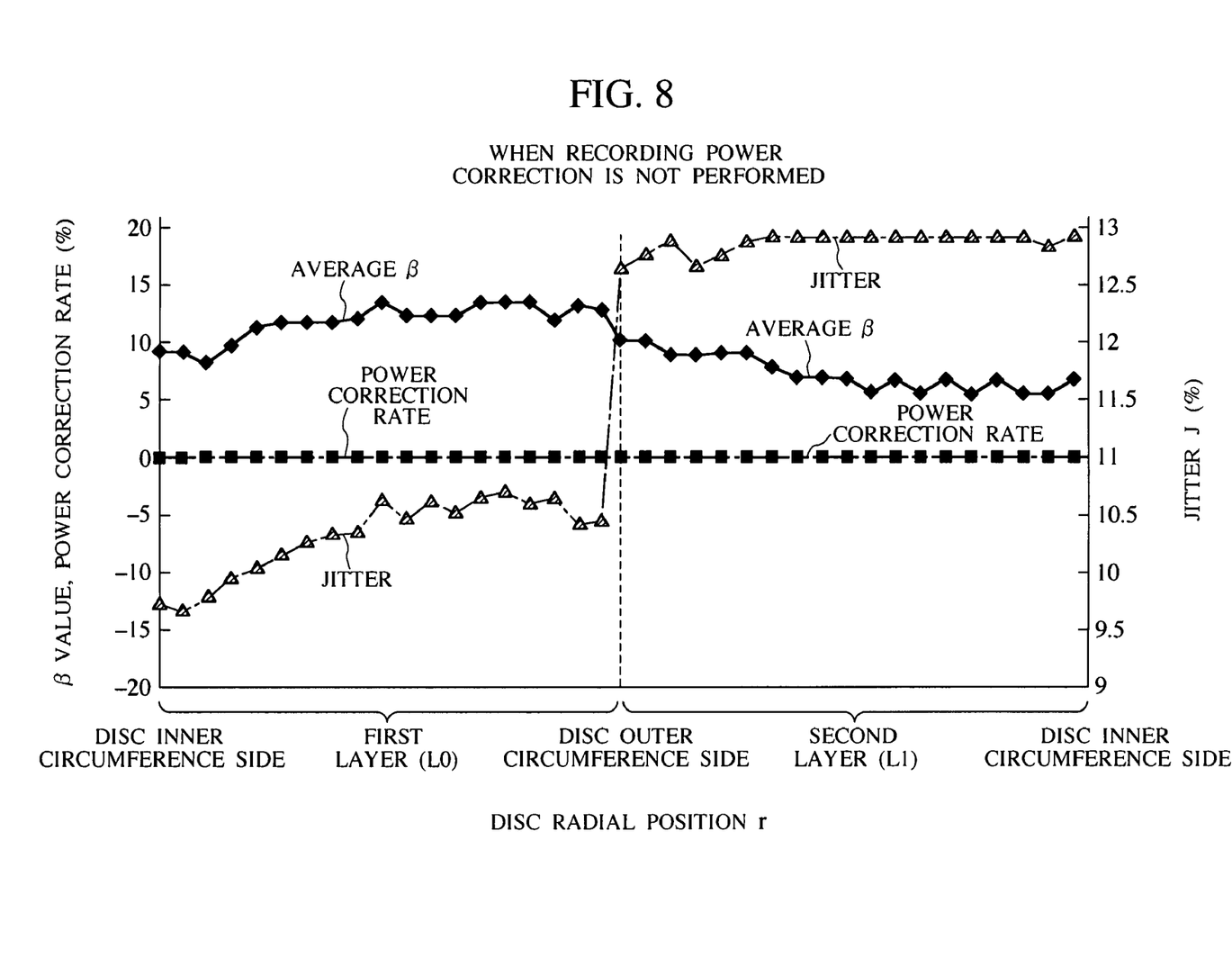
FIG. 8 is a diagram showing example characteristics of recording operation for a two-layer disc by the optical disc apparatus of FIG. 1 in the case where recording power correction is not performed.

FIGS. 7 and 8 show example characteristics of recording operation for a two-layer disc by the optical disc apparatus 1 of FIG. 1. FIG. 7 shows a case where recording power correction is performed according to the operation flow of FIG. 6, and FIG. 8 a case where the recording power correction is not performed.

Referring to FIG. 7, at the time of data recording onto a first layer (recording layer L0), a jitter value acquired on the disc innermost circumference side is a minimum and increases as the optical pickup radially moves outward. Recording power correction is performed for the first time at a disc radial position where an acquired jitter value is larger than a minimum jitter value on the disc inner circumference side by 0.5% or above. The recording power correction is performed based on the magnitude relation and the difference between the β value associated with the acquired jitter value (acquired β value) and the β value associated with the minimum jitter value (target β value). With the example characteristics of FIG. 7, the acquired β value is larger than the target β value at each disc radial position; therefore, the recording power is corrected so as to be decreased. Since the minimum jitter value is acquired on the disc innermost circumference side, the target β value learned at each disc radial position is the same as the β value acquired on the innermost circumference side and constant at each disc radial position. Subsequently, data recording is performed with the corrected recording power. While the recording power correction and data recording with the corrected recording power are repeated, the disc outermost circumference position is reached. Then, record processing proceeds to a second layer (recording layer L1). At the point of changeover from the first layer (recording layer L0) to the second layer (recording layer L1), the acquired jitter value as well as the acquired β value increases. Therefore, in order to reduce the recording power, a target β value lower than that for the first layer (recording layer L0) is set, and data recording is then performed with recording power corrected based on that target β value. Subsequently, also in the second layer (recording layer L1), data recording is performed with the recording power corrected based on a target β value learned and a β value acquired at each disc radial position in the same manner as in the case of the first layer (recording layer L0).

In contrast to the characteristics of FIG. 7, FIG. 8 shows the characteristics when recording power correction is not performed. With the characteristics of FIG. 8, particularly in recording in the second layer (recording layer L1), the initial jitter value is large because of inferior processing accuracy of the first OPC performed prior to recording. However, with the characteristics of FIG. 8, neither learning of the target β value for reducing the jitter value nor recording power correction based thereon, as seen with the characteristics of FIG. 7, is performed. Therefore, the initial jitter value is not subsequently improved but further increases.

In accordance with the above-mentioned optical disc apparatus 1 as an embodiment of the present invention, the minimum jitter value is determined in relation to the disc radial position, the recording power is corrected based on the β value at that time, and recording is performed based on the corrected recording power. Accordingly, it is possible to perform data recording with the recording power in which the adverse effects due to performance variations among apparatuses, performance variations due to disc radial positions (zones) of an optical disc, etc. are suppressed, thereby stably ensuring recording quality.

Although the above-mentioned embodiment is configured such that the microcomputer 30 controls the DSP 20, the present invention is not limited thereto. For example, it is also possible that the whole or part of the microcomputer is included in the DSP 20, or that some of the circuits in the DSP 20, for example, the β acquisition unit 205, the recording power correction and calculation unit 206, etc. are included in the microcomputer 30. Further, although the above-mentioned embodiment is configured such that the controller 301 as control means, the jitter comparator 3021 as jitter comparison means, the target β learning unit 3022 as target β learning means, and the β comparator 3023 are provided in or formed as the microcomputer 30 and such that the jitter acquisition unit 204 as jitter acquisition means, the β acquisition unit 205 as β acquisition means, the recording power correction and calculation unit 206 as recording power correction and calculation means, and the memory 207 are provided in the DSP 20, the present invention is not limited thereto either.

Further, with the above-mentioned embodiment, although the case where a jitter value is measured and the recording power is corrected and controlled based on the jitter value has been explained, it is also possible to adjust a recording strategy or perform control so as to stop the illumination of the laser diode based on the jitter value. Further, with the above-mentioned embodiment, although the target β value is learned based on the jitter value, the optical disc apparatus of the invention may also be configured such that the learning of the target β value is performed based on the amplitude of a reproduced signal (RF signal), the temperature of the apparatus, etc. Further, with the above-mentioned embodiment, although the interval between adjacent disc radial positions at which a minimum jitter value is determined or a target β value learned, i.e., the radial distance S between the position at which recording operation is suspended and the position at which the recording operation is suspended again, is equalized for each interval between adjacent disc radial positions, the present invention is not limited thereto.

As mentioned above, the optical disc apparatus according to the present invention can perform data recording with the recording power that ensures recording quality.

The present invention may be embodied in other specific forms without departing from the spirit or essential characteristics thereof. The above embodiment is therefore to be considered in all respects as illustrative and not restrictive, the scope of the present invention is indicated by the appended claims, and all changes which come within the meaning and range of equivalency of the claims are therefore intended to be embraced therein.

What is claimed is:

1. An optical disc apparatus which irradiates an optical disc with laser light to perform data recording, comprising:
a laser drive circuit which drives a laser diode to emit the laser light;
β acquisition means for acquiring a β value of a recording mark recorded on the optical disc from a reproduced signal based on laser light reflected from the optical disc;
target β learning means for learning a target β value for apparatus control from the acquired β value; and
control means for controlling the laser drive circuit, the β acquisition means, and the target β learning means;
wherein, during data recording, a target β value is learned in relation to a disc radial position.

2. An optical disc apparatus which irradiates an optical disc with laser light to perform data recording, comprising:
a laser drive circuit which drives a laser diode to emit the laser light;
jitter acquisition means for acquiring a jitter value from a reproduced signal based on laser light reflected from the optical disc;
jitter comparison means for comparing the acquired jitter value with a reference value; and
control means for controlling the laser drive circuit, the jitter acquisition means, and the jitter comparison means;
wherein, during data recording, a jitter value is acquired in relation to a disc radial position, and if the jitter value exceeds the reference value, a trial recording zone is reselected to perform trial record processing.

3. An optical disc apparatus which irradiates an optical disc with laser light to perform data recording, comprising:
a laser drive circuit which drives a laser diode to emit the laser light;
jitter acquisition means for acquiring a jitter value from a reproduced signal based on laser light reflected from the optical disc;
β acquisition means for acquiring a β value of a recording mark recorded on the optical disc from the reproduced signal;
jitter comparison means for comparing the acquired jitter values to determine a minimum jitter value;
target β learning means for learning a β value associated with the minimum jitter value as a target β value for recording power control;
recording power correction and calculation means for calculating a recording power correction quantity or correction rate based on the result of comparison of a β value acquired after learning the target β value with the target β value; and
control means for controlling the laser drive circuit, the jitter acquisition means, the β acquisition means, the jitter comparison means, the target β learning means, and the recording power correction and calculation means;
wherein, during data recording, a controller compares in relation to a disc radial position jitter values to determine a minimum jitter value, learns a target β value based on the determination result, and corrects recording power based on the target β value or performs trial record processing again.

4. The optical disc apparatus according to claim 3, wherein:
if the acquired jitter value is larger than the minimum jitter value and the difference therebetween is equal to or larger than a preset first reference value and less than a preset second reference value as a result of the jitter value comparison, the control means instructs the recording power correction and calculation means to calculate the recording power correction quantity or correction rate based on the magnitude relation and the difference between the β value associated with the acquired jitter value and the target β value and instructs the optical disc apparatus to perform recording power correction based on the calculation result, and if the difference is equal to or larger than the second reference value, the control means forms and outputs a signal for designating trial record processing.

5. The optical disc apparatus according to claim 3, wherein:
if the acquired jitter value is larger than the minimum jitter value and the difference therebetween is equal to or smaller than a preset reference value as a result of the jitter value comparison, and if the acquired β value is larger than the target β value and exceeds a preset reference value as a result of the β value comparison, the control means instructs the recording power correction and calculation means to calculate the recording power correction quantity or correction rate based on the magnitude relation and the difference between the β value associated with the acquired jitter value and the target β value and instructs the optical disc apparatus to perform recording power correction based on the calculation result.

6. The optical disc apparatus according to claim 5, wherein:
if the acquired jitter value is larger than the minimum jitter value and the difference therebetween exceeds the reference value as a result of the jitter value comparison, the control means forms and outputs a signal for designating trial record processing.

7. The optical disc apparatus according to claim 3, wherein:
after the recording power correction and calculation means calculates the recording power correction quantity or correction rate, the control means instructs the optical disc apparatus to resume recording operation.

8. The optical disc apparatus according to claim 4, wherein:
after the recording power correction and calculation means calculates the recording power correction quantity or correction rate, the control means instructs the optical disc apparatus to resume recording operation.

9. The optical disc apparatus according to claim 5, wherein:
after the recording power correction and calculation means calculates the recording power correction quantity or correction rate, the control means instructs the optical disc apparatus to resume recording operation.

10. The optical disc apparatus according to claim 6, wherein:
after the recording power correction and calculation means calculates the recording power correction quantity or correction rate, the control means instructs the optical disc apparatus to resume recording operation.

11. A data recording method of an optical disc apparatus which irradiates an optical disc with laser light to perform data recording, comprising the steps of:
suspending recording operation at the time of data recording, acquiring a jitter value from a reproduced signal based on laser light reflected from the optical disc in relation to a disc radial position, and at the same time, acquiring a β value of a recording mark recorded on the optical disc;

comparing the acquired jitter value with a prestored jitter value to determine a minimum jitter value;

learning a β value associated with the determined minimum jitter value as a target β value;

correcting recording power based on the magnitude relation and the difference between the β value associated with the jitter value and the target β value if the acquired jitter value is larger than the minimum jitter value by a preset reference value or above; and canceling the suspended state of the recording operation and irradiating the optical disc surface with laser light having the corrected recording power to resume the recording operation.

12. The data recording method of an optical disc apparatus according to claim 11, wherein:

procedures in each of the steps are performed at a plurality of radial positions of the optical disc.

* * * * *